Patented June 16, 1942

2,286,334

UNITED STATES PATENT OFFICE 2,286,334

EXTRACTION PROCESS

Robert Louis Brandt, New York, N. Y., assignor to Coffee Products Corporation, New York, N. Y., a corporation of New York No Drawing. Application June 7, 1941, Serial No. 397,083

3 Claims. (Cl. 99—71)

This invention relates to improvements in the production of coffee extracts or coffee concentrates, and more particularly to an improved process by which a coffee extract which, when dissolved in hot water will give a beverage closely approximating freshly brewed coffee, may be readily prepared.

In accordance with the present invention, roasted coffee is subjected to extraction with ethylene oxide, the ethylene oxide is distilled off, and the resulting extract (the residue), which contains much of the aromatic principles of the coffee, is combined with a coffee extract, usually a powder, prepared by the aqueous extraction of roasted coffee, i. e., fresh roasted coffee or roasted coffee which has been subjected to extraction by ethylene oxide.

In carrying out the extraction with ethylene oxide, it is necessary to use either a temperature sufficiently low to keep the ethylene oxide liquid at ordinary pressures, i. e., below about 10° C., or a pressure sufficiently high to keep the ethylene oxide liquid at whatever temperature is used, the extraction being readily carried out in any of the known ways. To remove the ethylene oxide from the extract, it is sufficient to evaporate it at ordinary temperatures and pressures, and it is advisable to raise the temperature somewhat toward the end of the operation to insure removal of all of the ethylene oxide. Temperatures of 50 to 100° C. do not seem to measurably damage the aroma or flavor of the extract.

Ethylene oxide absorbed by the coffee grounds is similarly removed by evaporation, and the remaining particles may be extracted with water to form a concentrated aqueous extract. Advantageously this extraction is carried out countercurrently with cold or cool water, and the aqueous extract is dried to form a powder, advantageously by spray drying.

The ethylene oxide extract and the dry powder are then thoroughly mixed together in a suitable mixing machine. Mixing by hand ordinarily does not insure sufficiently thorough distribution of the more or less oily ethylene oxide extract through the powder. The ethylene oxide extract may, of course, be used in other ways or for other purposes. It may, for example, be incorporated in a liquid extract; used for flavoring or perfuming purposes, etc.

I claim:

1. The process of producing a coffee extract which comprises extracting ground roasted coffee with ethylene oxide and removing the ethylene oxide from the extract.

2. The process of producing a coffee extract which comprises extracting ground roasted coffee with ethylene oxide, removing the ethylene oxide from the extract and combining it with an aqueous extract of roasted coffee.

3. The process of producing a coffee extract which comprises extracting ground roasted coffee with ethylene oxide, removing the ethylene oxide from the extract and combining it with a dry aqueous extract of roasted coffee.

ROBERT LOUIS BRANDT.